United States Patent [19]

Veber et al.

[11] 3,888,836
[45] June 10, 1975

[54] PENTAPEPTIDE INTERMEDIATE OF LHRH AND DERIVATIVES THEREOF

[75] Inventors: Daniel F. Veber; Stephen F. Brady, both of Westfield, N.J.

[73] Assignee: Merck & Co., Inc., Rahway, N.J.

[22] Filed: May 30, 1972

[21] Appl. No.: 257,623

[52] U.S. Cl. ............................................. 260/112.5
[51] Int. Cl. .................... C07c 103/52; A61k 27/00
[58] Field of Search ................................ 260/112.5

[56] References Cited
UNITED STATES PATENTS
3,796,697   3/1974   Fluoret ........................... 260/112.5

OTHER PUBLICATIONS

Geiger et al.: Biochem. Biophys. Res. Comm., 45, 767–73 (1971).
Sievertsson et al: J. Med. Chem., 15, 222–6 (1972).
Matsuo et al., Biochem. Biophys. Res. Comm., 43, 1334 (1971)
Baba et al., Biochem. Biophys. Res. Comm., 44, 459 (1971).
Burgus et al., C.R. Acad. Sci. Paris, 273, Ser. D, 1611 (1971)
Schally et al., Chem. Abstr., 76, 42148d (1972), eff. date Sept. 1971.
M. Bodanszky and M. Ordetti, "Peptide Synthesis," Interscience, New York, pp. 75–81 (1966).

*Primary Examiner*—Lewis Gotts
*Assistant Examiner*—Reginald J. Suyat
*Attorney, Agent, or Firm*—J. Jerome Behan; Henry H. Bassford, Jr.

[57] ABSTRACT

Synthetic peptide composition, pyroglutamyl-histidyl-tryptophanyl-seryl-tyrosyl-glycyl-leucyl-arginyl-prolyl-glycinamide (hereinafter designated pyroglu-his-trp-ser-tyr-gly-leu-arg-pro-gly-$NH_2$) is prepared by controlled, stepwise procedure starting with individual amino acid components. This peptide composition has the property of inducing release and/or synthesis of the follicle stimulating and luteinizing hormone substances in living systems, and is herein referred to as FSH/LH-RH.

4 Claims, No Drawings

PENTAPEPTIDE INTERMEDIATE OF LHRH AND DERIVATIVES THEREOF

This invention is concerned generally with novel processes for the controlled stepwise synthesis of FSH/LH-RH, a decapeptide having the structure pyroglu-his-trp-sentyr-gly-leu-arg-pro-gly-NH$_2$, in which synthesis individual amino acid components of the peptide chain are connected in the stated sequence by peptide linkages; and to intermediates in said novel processes. More particularly, FSH/LH-RH is prepared either by successively introducing each of the individual amino acid components stepwise in sequence, or by synthesizing two or more segments of the peptide chain followed by coupling of such segments in the stated sequence.

FSH/LH-RH is useful in inducing release and/or synthesis of follicle stimulating and luteinizing hormone substances by living systems, and is particularly valuable for effecting release of such hormone substances by cells of the anterior pituitary. FSH/LH-RH is conveniently administered by injection, thereby effecting release and/or synthesis of follicle stimulating and luteinizing hormones.

The abbreviated designations, which are used herein for the animo acid components, their derivatives, and certain preferred protecting groups employed in this invention are as follows:

| Amino Acid | Abbreviated Designation |
| --- | --- |
| L-arginine | arg |
| glycine | gly |
| L-histidine | his |
| L-leucine | leu |
| L-proline | pro |
| L-pyroglutamic acid | pyroglu |
| L-serine | ser |
| L-tryptophane | trp |
| L-tyrosine | tyr |

| Derivatives; Protecting Groups | Abbreviated Designation |
| --- | --- |
| N-carboxyanhydride | NCA |
| Nitro | NO$_2$ |
| Tertiary-butyloxycarbonyl | tBOC |
| N-hydroxysuccinimide ester | NHS |
| Methyl ester | OMe |
| Trifluoroacetic acid | TFA |
| Dicyclohexylcarbodiimide | DCC |
| Ethyl ester | OEt |

In accordance with the present invention, FSH/LH-RH is prepared by stepwise coupling (by peptide linkages) of each of its individual amino acid components, which peptide coupling is conducted by reacting the appropriate amino acid in the sequence (as a derivative in which the carboxyl grouping is activated and any amino groups are protected) first with glycine amide (the amino acid at the C-terminus i.e. carboxy end of the decapeptide chain), and then subsequently with each resulting polypeptide intermediate, such stepwise method being referred to herein as sequential synthesis. When this sequential synthesis is conducted in solution, it is ordinarily preferred to utilize, as the carboxyl-activated amino acid, the amino acid NCA, the amino acid TCA, the amino acid azide, or an activated ester such as the NHS ester of such amino acid, or, if desired, to employ a free carboxyl-containing amino acid in conjunction with a coupling agent such as dicyclohexylcarbodiimide. These NCA and TCA sequential synthesis procedures are more fully described in French Pat. No. 1,497,536, granted Sept. 4, 1967.

Alternatively, FSH/LH-RH is prepared using solid phase sequential synthesis procedure starting from the C-terminus. In this procedure, the carboxyl end of the terminal amino acid, glycine (and of the polypeptide product in the following steps), is bound covalently to an insoluble polymeric resin support, as for example as the carboxylic ester of the resin-bonded benzyl alcohol present in hydroxy-methyl-substituted polystyrene-divinyl-benzene resin. In this solid phase procedure, the peptide coupling may involve direct condensation between the free carboxyl of an amino acid reactant and the amino group of the resin-bonded glycine or polypeptide. Such reaction is ordinarily conducted in the presence of a coupling agent such as dicyclohexylcarbodiimide, although the amino acid reactant may be employed in the form of a carboxyl-activated amino acid such as the NHS ester, an amino acid azide, and the like.

Instead of sequential synthesis, FSH/LH-RH can also be prepared by block synthesis, wherein various peptide segments of the FSH/LH-RH chain are individually synthesized, and these segments are then coupled in proper sequence to form the desired decapeptide product. These peptide segments are themselves conveniently prepared by sequential synthesis in solution using the NCA, TCA, azide or NHS ester procedure or by solid phase sequential synthesis using carboxyl-activated NHS ester or amino acid azide or, if desired, a free carboxyl-containing amino acid reactant in conjunction with a coupling agent. The number of amino acid components in the peptide segments used in block synthesis of FSH/LH-RH may vary from two to eight, but peptide segments containing five amino acid components or less are preferably utilized, this avoiding condensations involving larger peptide segments with attendant losses of these more valuable higher peptide fragments.

In carrying out these sequential or block syntheses, involving reaction between carboxyl (or activated carboxyl) of one amino acid and amino grouping of the other, it is ordinarily preferred to protect the amino groupings in the amino acid or peptide undergoing reaction at the carboxyl end of the molecule, as well as other functional groupings in both reactants reactive under the conditions of such syntheses. Protecting groups must retain their protecting properties under the peptide coupling conditions, and must be selectively removable without affectting peptide linkages. Protecting groups to be removed following a particular step must also be selectively removable without affecting other protecting groups to be retained in later coupling steps.

Amino-protecting groups ordinarily employed include salt formation for protecting strongly-basic amino groups, nitro particularly useful for protecting the basic amino of arginine, acyl-type substituents such as formyl, phthalyl, trifluoroacetyl, toluenesulfonyl, dibenzylphosphoryl, nitrophenylsulfenyl, tritylsulfenyl, o-nitrophenoxy-acetyl, and the like, urethane protecting substituents such as benzyloxy-carbonyl (carbobenzoxy), p-methoxycarbobenzoxy, p-nitrocarbobenzoxy, t-butyloxycarbonyl, 2-(p-biphenylyl)-2-propyloxycarbonyl, isonicotinyloxycarbonyl, and the like, alkyl-type substituents such as triphenylmethyl, trialkyl-silyl, trimethyl-silyl, and the like. It is preferred to utilize tert-butyloxycarbonyl (tBOC) for protecting the α-amino group in the amino acids (or peptides) undergoing reaction at the carboxyl end of the molecule, since the tBOC protecting group is readily removed following such reaction and prior to the subsequent step (wherein such α-amino group itself undergoes reaction) by relatively mild action of acids (e.g. trifluoroacetic acid, or hydrogen chloride in ethyl acetate) which treatment does not affect groupings, such as nitro, carbobenzoxy (Cbz) and isonicotinyloxycarbonyl, used to protect other amino groups such as the basic amino group of arginine, and removable by vigorous action of a strong acid cleaving agent (e.g. hydrogen bromide in glacial acetic acid or anhydrous hydrogen fluoride in the presence of anisole).

Carboxyl-protecting groups ordinarily employed include amides, salt formation, ester substituents such as the methyl and ethyl esters (which are preferred where subsequent conversion, via the hydrazide, to the azide is desired), the benzyl ester, and particularly the resin-bonded benzyl ester, used in solid phase synthesis (which reacts directly with hydrazine to cleave the peptide from the resin and form the peptide hydrazide), p-nitrobenzylester, t-butyl ester, and the like. Hydroxyl groupings are ordinarily not protected in the synthesis of FSH/LH-RH where the coupling reactions are conducted in solution, although tetrahydropyranyl, benzyl, trifluoroacetyl, t-butyl, and the like, may be used for such protection if desired. It is usually preferred, however, to use these O-protecting substituents, and particularly the O-benzyl and O-t-butyl groups, when utilizing solid phase synthesis for the preparation of the serine-conducting segment of the FSH/LH-RH chain. The imidazole nitrogen of histidine may also be protected, if desired, preferably using an N-hydrocarbon (or substituted-hydrocarbon) substituent such as N-benzyl, N-(2,4-dinitrophenyl), and the like.

The selection of protecting groups is in part dictated by particular coupling conditions, in part by the amino acid and peptide components involved in the reaction.

Guides for selecting particular protecting groups to be employed herein are set forth in detial in the aforesaid French Pat. No. 1,496,536, and the protecting groups disclosed in that patent are incorporated herein by reference.

The preferred overall procedure for preparation of FSH/LH-RH is outlined diagrammatically in FIG. 1 as follows:

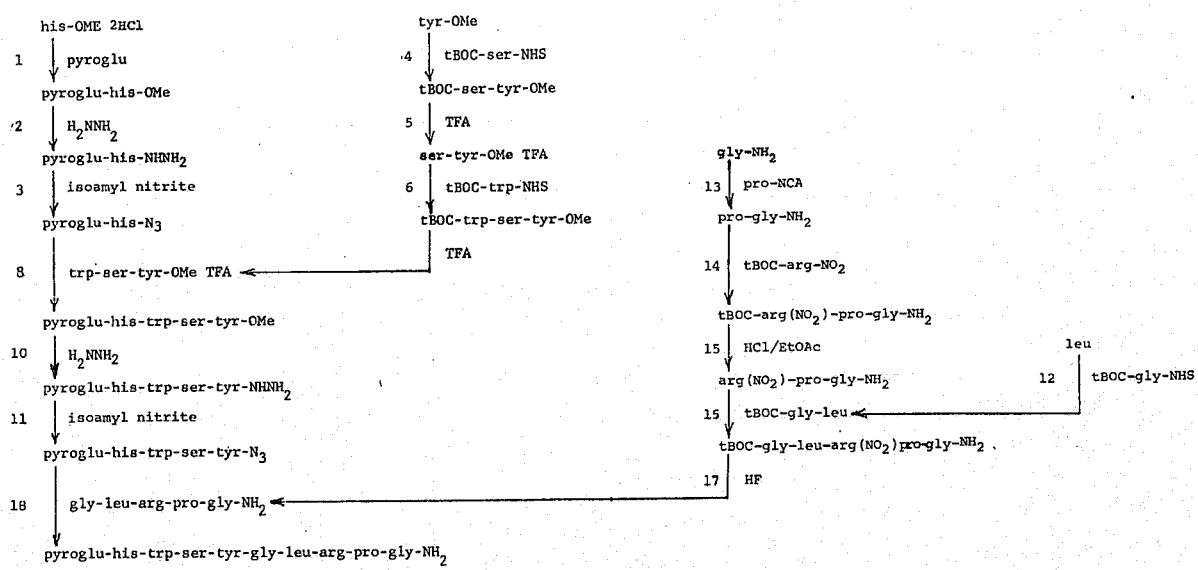

Figure 1

The number appearing next to each arrow refers to the illustrative example which sets forth the experimental details for the indicated conversion.

These preferred overall procedures involve combinations of sequential and block syntheses, wherein certain peptide segments of the decapeptide chain are initially formed by the stepwise method, either by sequential synthesis in solution or by solid phase sequential synthesis, and these segments are then coupled in proper sequence. In this procedure, the tBOC substituent is used to protect α-amino groupings, the NO₂ substituent is used to protect the basic primary amino group of arginine, and the methyl ester substituent is used to protect the carboxyl groups of histidine, tyrosine, pyroglutamyl-histidine, seryl-tyrosine, tryptophanyl-seryl-tyrosine and pyroglutamyl-histidyl-tryptophanyl seryl tyrosine; in the cases of pyroglu-his and pyroglu-his-trp-ser-tyr, the methyl ester serves the further purpose of providing the intermediates for preparing, via the hydrazide, pyroglu-his azide and pyroglu-his-trp-ser-tyr azide. Instead of this preferred method, however, the present invention also contemplates the various permutations of alternate routes, and employment of other protecting groupings fulfilling criteria hereinabove discussed, such alternate routes likewise involving sequential synthesis in solution, sequential synthesis in solid phase, and combinations of sequential and block synthesis procedures.

As reference to FIG. 1 will show, one preferred overall procedure for preparing FSH/LH-RH specifically involves sequential synthesis in solution of (a) the pentapeptide segment, gly-leu-arg-pro-gly-NH$_2$, and (b) the carboxyl-activated, pentapeptide segment, pyroglu-his-trp-ser-tyr azide. The former pentapeptide is prepared by reacting gly-NH$_2$ with pro-NCA, which reaction is conducted by vigorously agitating the reactants together in aqueous solution at pH 10.7, under which conditions the reaction is ordinarily complete in about one to two minutes. The alkaline solution is acidified thereby decomposing the intermediate carbamate to form an aqueous solution of pro-gly-NH$_2$, the pH of the solution is then adjusted to pH 9.5, the solution freeze dried, and the residual material extracted with chloroform. Evaporation of the chloroform extract, and crystallization of the residual oil from an organic solvent such as chloroform -ethyl acetate gives substantially pure pro-gly-NH$_2$.

This pro-gly-NH$_2$ is reacted with tBOC-nitroarginine, which reaction is conducted by bringing the reactants together in acetonitrile in the presence of dicyclohexylcarbodiimide at a temperature of about 20°C, under which conditions reaction is ordinarily complete in about 3–4 hours. The reaction mixture is evaporated in vacuo, the residual oil is dissolved in water, and the aqueous solution extracted with a water-immiscible solvent such as chloroform; the aqueous solution is then evaporated in vacuo, and the residual material purified by chromatography to give substantially pure tBOC-(NO$_2$) arg-pro-gly-NH$_2$. This tripeptide is treated with hydrogen chloride in ethyl acetate, thereby cleaving the tBOC substituent to form (NO$_2$) arg-pro-gly-NH$_2$.

The dipeptide segment tBOC-gly-leu is prepared by reacting leucine with the NHS ester of tBOC-glycine in ethanol solution under alkaline conditions (preferably pH 8.0), thereby forming tBOC-gly-leu; this protected dipeptide is then reacted with (NO$_2$) arg-pro-gly-NH$_2$ by bringing the reactants together in dimethyl formamide, adjusting the pH to 9.5 by addition of triethylamine, and then adding a solution of hydroxybenztriazole in methylene chloride, followed by a solution of dicyclohexylcarbodiimide in methylene chloride. Under these conditions, the tBOC-gly-leu reacts initially with the hydroxybenztriazole to form the corresponding ester [which protects the dipeptide from racemization during reaction with the (NO$_2$)arg-pro-gly-NH$_2$]. The reaction mixture is stirred at about 25°C. for a period of about 3–4 hours, at the end of which time the reaction of the said hydroxybenztriazole ester of tBOC-gly-leu with the (NO$_2$)arg-pro-gly-NH$_2$ to form the pentapeptide in substantially complete. The reaction mixture is evaporated in vacuo, the residual material is triturated with an organic solvent such as ethyl acetate, and purified by chromotography to give substantially pure tBOC-gly-leu-arg(NO$_2$)-pro-gly-NH$_2$. This protected pentapeptide is then reacted with anhydrous hydrogen fluoride, preferably in the presence of anisole at a temperature of below about 0°C, under which conditions cleavage of both the tBOC and nitro substituents is complete in about 30 minutes. Excess hydrogen fluoride is conveniently removed by passing a stream of nitrogen through the reaction mixture. The latter is then triturated with ether, dissolved in acetic acid, and the acetic acid solution evaporated in the cold, preferably by freeze-drying to give the unprotected pentapeptide-amide salt, gly-leu-arg-pro-gly-NH$_2$ hydrofluoride.

The terminal tripeptide sequence of the second pentapeptide, in the form of its alkyl ester trifluoroacetate, such as trp-ser-tyr-OMe TFA, trp-ser-tyr-OEt TFA, and the like, is prepared by first reacting the tyrosine alkyl ester with the NHS ester of tBOC-serine in dimethylformamide solution under alkaline conditions (preferably pH 8.0), thereby forming tBOC-ser-tyr-OMe or tBOC-ser-tyr-OEt; this dipeptide is treated with trifluoroacetic acid thereby forming ser-tyr-OMe trifluoroacetate or ser-tyr-OEt trifluoro acetate. This ser-tyr alkyl ester TFA is reacted with NHS ester of tBOC-trp in dimethylformamide solution under mildly alkaline conditions (preferably pH 8.0) to form the tripeptide, tBOC-trp-ser-tyr-OMe or tBOC-trp-ser-tyr OEt, which is reacted with trifluoroacetic acid thereby forming trp-ser-tyr-OMe TFA or trp-ser-tyr-OEt TFA.

The remaining dipeptide segment of this second pentapeptide, in the form of its azide, namely pyroglu-his-N$_3$, is prepared by first reacting the methyl ester of histidine with pyroglutamic acid in acetonitrile containing triethylamine, in presence of dicyclohexylcarbodiimide. The mixture is stirred at a temperature of about 25°C, under which conditions the reaction is complete in about 20–25 hrs. The reaction mixture is evaporated in vacuo to small volume, and the resulting mixture is filtered, thereby separating dicyclohexulurea. The filtered solution is diluted with several volumes of ether, and the material which precipitates is recovered by filtration, and crystallized from an organic solvent such an isopropanol to give pyroglu-his-OMe. The latter is reacted with hydrazine, and the resulting hydrazide is treated with isoamyl nitrite thereby forming pyrogluhis azide.

This pyroglu-his azide is then reacted with the alkyl ester of trp-ser-tyr in dimethylformamide solution under mildly alkaline conditions (preferably pH 8.0) to form the corresponding pentapeptide, pyroglu-his-trp-ser-tyr-OMe or pyroglu-his-trp-ser-tyr-OEt, which is, in turn, reacted with hydrazine, and the resulting hydrazide treated with isoamyl nitrite, thereby forming pyroglu-his-trp-ser-tyr azide.

The two pentapeptides gly-leu-arg-pro-gly-NH$_2$ and pyroglu-his-trp-ser-tyr azide are reacted in dimethylformamide solution under mildly alkaline conditions (preferably pH 8.0), thereby forming the decapeptide, pyroglu-his-trp-ser-tyr-gly-leu-arg-pro-gly-NH$_2$, herein also referred to as FSH/LH-RH.

The following examples illustrate methods of carrying out the present invention, but it is to be understood that these examples are given for purposes of illustration and not of limitation.

EXAMPLE 1

About 12.1 g. of his-OMe hydrochloride, 6.5 g. of pyroglutamic acid and 14 ml. of triethylamine are dissolved in 200 ml. of acetonitrile, and to the solution is added, with stirring, 12.8 g. of dicyclohexylcarbodiimide. The resulting mixture is stirred for a period of about 22 hrs. while maintaining the temperature at about 25°C, and the reaction mixture is evaporated in vacuo to a volume of about 50 ml. The resulting mixture is filtered, thereby separating precipitated dicyclohexylurea, and the latter is washed with acetonitrile and then with methanol. The combined filtrates are evaporated in vacuo to about 50 ml. volume, about 200 ml of ether is added to the concentrated solution, and the material which precipitates is recovered by filtration, and crystallized from isopropanol to give about 5.0 g. of crystalline pyroglu-his-OMe.

EXAMPLE 2

To about 0.2 g. of pyroglu-his-OMe is added 10 ml. of a 1:1 mixture of anhydrous hydrazine and methanol. The resulting mixture is stirred for about 6 minutes at room temperature, and the reaction mixture is then evaporated in vacuo at a temperature of about 35°C. About 10 ml. of ethanol is added to the residual material, and the resulting mixture is evaporated in vacuo; about 10 ml. of dimethylformamide is then added and the resulting mixture is evaporated in vacuo. The residual oil is triturated with ethanol, dried in vacuo at room temperature, and crystallized from methanol to give about 0.19 g. of pyroglu-his hydrazide.

EXAMPLE 3

About 0.63 g. of pyroglu-his hydrazide, prepared as described in Example 2, is suspended in 80 ml. of freshly degassed dimethylformamide, and the suspension is cooled to a temperature of −40°C. and maintained under a dry nitrogen atmosphere to exclude moisture. To the cold suspension is added, with stirring, a solution of 4.0 ml of 3N hydrogen chloride in tetrahydrofuran followed by 0.3 ml of isoamylnitrite. The resulting mixture is maintained under a dry nitrogen atmosphere at a temperature of −15°C. to −20°C. for a period of about 2.5 hours, at the end of which time the hydrazide has completely reacted to form pyroglu-his azide.

EXAMPLE 4

About 2.54 g. of tyr-OME hydrochloride and about 3.02 g. of the NHS ester of tBOC-ser are dissolved in 100 ml. of freshly degassed dimethylformamide. The resulting solution is adjusted to pH 8.0 by the addition of diisopropylethylamine, and stirred for a period of about 4 hours, while maintaining the temperature at about 25°C. and the pH at 8.0 by the addition of diisopropylethylamine. The reaction mixture is evaporated in vacuo, the residual oil is dissolved in methylene chloride, and the methylene chloride solution is washed twice with 0.2N aqueous sulfuric acid solution saturated with sodium sulfate, once with saturated aqueous sodium chloride solution, twice with saturated aqueous sodium bicarbonate solution, and finally twice with saturated aqueous sodium chloride solution. The washed methylene chloride solution is then dried over anhydrous sodium sulfate, evaporated in vacuo, and the residual oil is crystallized from ethyl acetate-hexane to give 3.2 g. of crystalline tBOC-ser-tyr-OMe.

EXAMPLE 5

About 3.0 g. of this tBOC-ser-tyr-OMe is dissolved (at a temperature of about 0°C.) in the minimum quantity of trifluoroacetic acid, the solution is stirred at a temperature of about 25°C. for a period of about 45 minutes, and the solution is then added dropwise with vigorous stirring to a large volume (about 100 ml.) of ether. The material which precipitates is recovered by filtration, washed with ether, and dried in vacuo to give about 3.0 of ser-tyr-OMe trifluoroacetate.

EXAMPLE 6

About 2.83 g. of ser-tyr-OMe trifluoroacetate and about 2.48 g. of the NHS ester of tBOC-trp are dissolved in 60 ml. of freshly degassed dimethylformamide. The resulting solution is adjusted to pH 8.0 by the addition of triethylamine, and stirred for a period of about 1.5 hours while maintaining the temperature at about 25°C. and the pH at 8.0 by the addition of triethylamine. The reaction mixture is filtered and evaporated in vacuo, the residual syrup is dissolved in 100 ml. chloroform, and the solution is washed with 0.2N aqueous sulfuric acid solution, then with saturated aqueous sodium bicarbonate solution, and finally with water. The washed chloroform solution is dried over anhydrous sodium sulfate, partically evaporated in vacuo, and the product which crystallizes is recovered by filtration and dried to give about 2.4 g. of crystalline tBOC-trp-ser-tyr-OMe.

EXAMPLE 7

About 1.2 g. of this tBOC-trp-ser-tyr-OMe is suspended in about 4.3 ml of dimethylsulfide, and the mixture dissolved (at a temperature of about 0°C.) in about 13 ml. of trifluoroacetic acid. The resulting solution is stirred at a temperature of about 25°C. for a period of about 12 minutes, and the solution is then added dropwise, with vigorous stirring, to a large volume (about 250 ml.) of ether. The material which precipitates is recovered by filtration, washed twice with ether, and dried in vacuo to give about 1.1 g. of trp-ser-tyr-OMe trifluoroacetate.

EXAMPLE 8

The reaction solution containing pyroglu-his azide, prepared as described in Example 3, is cooled to a temperature of −40°C., and to this is added a solution of 1.1 g. of trp-ser-tyr-OMe trifluoroacetate in 4 ml. of degassed dimethylformamide. The pH of the resulting solution is adjusted to 8.0 by the addition of diisopropylethylamine, and the mixture is maintained at a temperature of about −5°C. (with periodic adjustment of the pH to 8.0 by addition of diisopropylethylamine) for a period of about 18 hours, at the end of which time the reaction to form the pentapeptide is substantially complete as may be shown by thin layer chromatography on silica gel G using the solvent system ethyl acetate-pyridine-acetic acid-water (10:5:1:3). The reaction solution is evaporated in vacuo; the residual material is dissolved in 50 ml. butanol; the butanol solution is washed with three 25 ml -portions of water; the combined water washings are extracted with six 10 ml.-portions of butanol; and the combined butanol solutions are evaporated to small volume. The crystalline material which precipitates is recovered by filtration, dried and further purified by chromatography on a silica gel column to give about 0.5 g. of substantially pure pyroglu-his-trp-ser-tyr-OMe.

EXAMPLE 9

In accordance with the procedures set forth in Examples 4–8 hereinabove, but utilizing tyr-OEt hydrochloride as starting material in place of the tyr-OMe hydrochloride employed in Example 4, there are obtained, respectively, tBOC-ser-tyr-OEt; ser-tyr-OEt TFA; tBOC-trp-ser-tyr-OEt; trp-ser-tyr-OEt TFA; and pyroglu-his-trp-ser-tyr-OEt.

EXAMPLE 10

To about 0.45 g. of either pyroglu-his-trp-ser-tyr-OMe or pyrogly-his-trp-ser-tyr-OEt, is added 20 ml of 1:1 mixture of anhydrous hydrazine and methanol. The resulting mixture is stirred for about 6 minutes at room temperature, and the reaction mixture is evaporated in vacuo at a temperature of about 35°C. About 10 ml. of ethanol is added to the residual material, and the resulting mixture is evaporated in vacuo; about 10 ml. of dimethylformamide is then added and the resulting mixture is evaporated in vacuo. The residual oil is triturated with isopropanol, and dried in vacuo to give about 0.44 g of pyroglu-his-trp-ser-tyr-hydrazide.

EXAMPLE 11

About 0.32 g. of pyroglu-his-trp-ser-tyr-hydrazide, prepared as described in Example 10, is suspended in 20 ml. of freshly degassed dimethylformamide, and the suspension is cooled to a temperature of −40°C. and maintained under a dry nitrogen atmosphere to exclude moisture. To the cold suspension is added, with stirring, a solution of 1.2 ml. of 3N hydorgen chloride in tetrahydrofuran, followed by 0.035 ml of isoamylnitrite. The resulting mixture is maintained under a dry nitrogen atmosphere at a temperature of −15°C. to −20°C. for a period of about 1 hour, at the end of which time the hydrazide has completely reacted to form pyroglu-his-trp-ser-tyr azide.

EXAMPLE 12

To an aqueous solution of 4.58 g of leu is added 200 ml. of ethanol, and the pH is adjusted to 8.0 by the addition of 50% aqueous potassium hydroxide solution. About 9.54 g. of the NHS ester of α-tBOC-gly is added with stirring to this leu solution, while maintaining the temperature at about 25°C. and the pH at 8.0 by the dropwise addition of 50% aqueous sodium hydroxide solution. When base consumption ceases, the reaction solution is filtered, the ethanol is evaporated therefrom in vacuo, and the aqueous reaction solution is extracted with 300 ml. of ethyl acetate, thereby extracting unreacted NHS ester present in said solution. The pH of the aqueous reaction solution is then adjusted to 2.5 by the addition of concentrated sulfuric acid, and the acidified solution is extracted with three 300 ml.-portions of ethyl acetate; these latter ethyl acetate extracts are combined, dried over anhydrous sodium sulfate, and the ethyl acetate evaporated therefrom in vacuo. This layer chromatography of the residual material on silica gel, using chloroform-methanol-water (80:18:2) as eluant, shows this product to be substantially pure of α-tBOC-gly-leu.

EXAMPLE 13

About 2.2 g. of gly-$NH_2$ is dissolved in 200 ml. of 1M aqueous potassium borate buffer * solution (pH=10.7), the solution is cooled to about 0°C., and about 3.52 g. of pro NCA is added to the solution in a single charge, during which time the mixture is vigorously agitated (preferably using a Waring blender) while maintaining the temperature at 0°C. and the pH at 10.7 by the dropwise addition of 50% aqueous potassium hydroxide. The reaction is allowed to proceed, while continuing agitation and maintaining temperature at 0°C. and pH at 10.7, until base consumption ceases (about 1 minute); sufficient concentrated sulfuric acid is added to bring pH to 2.5; and nitrogen is bubbled through the acidified reaction mixture for about 30 minutes, thereby sweeping carbon dioxide from the resulting solution of pro-gly-$NH_2$. The pH of this solution is adjusted to 9.5 with 50% potassium hydroxide solution, the solution is then freeze-dried, and the residual material is extracted with chloroform. The chloroform extract is filtered, evaporated to dryness, and the resulting oil is crystallized from chloroform-ethyl acetate to give 3.2 g. of substantially pure pro-gly-$NH_2$.

*This buffer is conveniently prepared as follows: one mole of boric acid is slurried in 500 ml. of water, and solid potassium hydroxide merely sufficient to dissolve the boric acid is added; additional potassium hydroxide is then added to bring the pH to 10.7, the solution is diluted to 990 ml., the pH is again adjusted to 10.7, and the solution diluted to a final volume of 1000 ml.

EXAMPLE 14

About 170 mg. of pro-gly-$NH_2$ and 320 mg. of tBOC-nitroarginine are dissolved in 10 ml. of acetonitrile. About 227 mg. of dicyclohexylcarbodiimide is added with stirring, and the mixture is stirred at a temperature of 20°C. for a period of approximately 3.5 hours. The reaction mixture is evaporated in vacuo, the residual oil is dissolved in water, and the aqueous solution is extracted with two 50 ml.-portions of chloroform. The aqueous solution is then evaporated in vacuo, and the residual oil is purified by chromatography on silica gel using chloroform-methanol-water (50:40:10) as eluant to give about 80 mg. of pure tBOC-arg ($NO_2$)-pro-gly-$NH_2$.

EXAMPLE 15

About 1.1 g. of the tBOC-arg($NO_2$)-pro-gly-$NH_2$ is suspended in about 100 ml. of ethyl acetate. The temperature is adjusted to about 5°C., and anhydrous hydrogen chloride gas is bubbled into the mixture (maintained at 5°C) for about 7 minutes. A stream of nitrogen is then passed through the reaction mixture until the latter is substantially purged of hydrogen chloride. The precipitated material is recovered by filtration, washed with ethyl acetate and dried in vacuo at 25°C. to give about 1.1 g. of substantially pure ($NO_2$) arg-pro-gly-$NH_2$ hydrochloride.

EXAMPLE 16

About 890 mg. of arg ($NO_2$)-pro-gly-$NH_2$ hydrochloride and about 567 mg. of tBOC-gly-leu are dissolved in 10 ml. of freshly degassed dimethylformamide. The resulting solution is adjusted to pH 9.5 by the addition of triethylamine. A solution of 440 mg. of hydroxybenztriazole in 18 ml. of methylene chloride is added, followed by a solution of 540 mg. of dicyclohexylcarbodiimide in 12 ml. of methylene chloride, and the mixture is stirred for a period of 3.5 hours while maintaining the temperature at about 25°C. The reaction mixture is evaporated in vacuo, and triturated with ethyl acetate. The resulting solid (1.2 g.) is subjected to chromatography on silica gel using mixture of chloroform: methanol: water (80:18:2) as eluant to give about 300 mg. of substantially pure tBOC-gly-leu-arg($NO_2$)-pro-gly-$NH_2$.

EXAMPLE 17

About 200 mg. of tBOC-gly-leu-arg($NO_2$)-pro-gly-$NH_2$ is dried in vacuo over phosphorus pentoxide for a period of about 15 hours, thereby removing traces of water, and the resulting dry material is placed in a polyethylene tube containing about 0.3 ml. of anisole. The mixture is cooled to a temperature of about 78°C., four ml. of anhydrous hydrogen fluoride is condensed in the tube, and the resulting mixture is stirred at a temperature of about 0°C. for a period of about 30 minutes. At the end of this reaction period, a stream of dry nitrogen is passed through the mixture (still at 0°C.), thereby removing excess hydrogen fluoride. The residual material is held in vacuo at a temperature of about 25°C. for a period of about 20 minutes, triturated with ether, washed with ether, dissolved in aqueous acetic acid, and the aqueous acetic acid solution is freeze-dried to give about 190 mg. of substantially pure gly-leu-arg-pro-gly-NH$_2$ hydrofluoride.

EXAMPLE 18

The reaction solution containing pyroglu-his-trp-ser-tyr azide, prepared as described in Example 11, is cooled to a temperature of −40°C., and to this is added a solution of 251 mg. of gly-leu-arg-pro-gly-NH$_2$ hydrofluoride in 4 ml. of degassed dimethylformamide. The pH of the resulting solution is adjusted to 8 by the addition of diisopropylethylamine, and the mixture is maintained at a temperature about −5°C. (with periodic adjustment of the pH to 8.0 by addition of diisopropylethylamine) for a period of about 20 hours, at the end of which time the reaction to form the decapeptide is substantially complete as may be shown by thin layer chromatography on silica gel G using the solvent system ethyl acetate-pyridine-acetic acid-water (5:5:1:3:). The reaction solution is evaporated in vacuo; the residual material is triturated with ethanol; and the resulting solid material is washed 3 times with ethanol and further purified chromatographically to give about 0.41 g. of substantially pure pyroglu-his-trp-ser-tyr-gly-leu-arg-pro-gly-NH$_2$.

Various changes and modifications may be made in carrying out the present invention without departing from the spirit and scope thereof. Insofar as these changes and modifications are within the purview of the annexed claims, they are to be considered as part of this invention.

What is claimed is:

1. The pentapeptide pyroglu-his-trp-ser-tyr, and hydrazide, azide, and lower alkyl ester derivatives thereof.

2. The unprotected pentapeptide, as defined in claim 1, having the structure pyroglu-his-trp-ser-tyr.

3. The pentapeptide derivative, as defined in claim 1, having the structure pyroglu-his-trp-ser-tyr-OEt.

4. The pentapeptide derivative, as defined in claim 1, having the structure pyrogly-his-trp-ser-tyr azide.

* * * * *